United States Patent [19]

Wink et al.

[11] Patent Number: 4,463,779
[45] Date of Patent: Aug. 7, 1984

[54] FORMABLE, SHAPE RETENTIVE HOSE

[75] Inventors: Clifford W. Wink, Denver; Guy T. Bixby, Longmont, both of Colo.

[73] Assignee: The Gates Rubber Company, Denver, Colo.

[21] Appl. No.: 355,033

[22] Filed: Mar. 5, 1982

[51] Int. Cl.³ .......................................... F16L 55/00
[52] U.S. Cl. .................. 138/125; 138/103; 138/127; 138/133; 138/174; 138/DIG. 8
[58] Field of Search ............... 138/124, 125, 126, 127, 138/132, 133, 138, 174, 172, 178, DIG. 8, 103

[56] References Cited

U.S. PATENT DOCUMENTS

| 2,448,485 | 8/1948 | Chernack | 138/133 |
| 2,704,556 | 3/1955 | Blish | 138/DIG. 8 |
| 2,998,028 | 8/1961 | Rohde | 138/DIG. 8 X |
| 4,327,775 | 5/1982 | Tally | 138/DIG. 8 X |

FOREIGN PATENT DOCUMENTS

| 1023440 | 1/1958 | Fed. Rep. of Germany | 138/174 |
| 447816 | 5/1936 | United Kingdom | 138/174 |
| 647226 | 12/1950 | United Kingdom | 138/174 |

Primary Examiner—James E. Bryant, III
Attorney, Agent, or Firm—H. W. Oberg, Jr.; C. H. Castleman, Jr.; Raymond Fink

[57] ABSTRACT

A formable hose with a reformable wire embedded solely in a thicker portion of the hose cover, the reformable wire oriented longitudinally of the hose.

6 Claims, 6 Drawing Figures

FORMABLE, SHAPE RETENTIVE HOSE

BACKGROUND OF THE INVENTION

The invention relates to polymeric hose of the rubber or plastic type with distinct metal reinforcement, but more particularly, the invention applies to automotive type heater hose with embedded wire reinforcement as a means for giving the hose shape retentivity.

Engine compartments appear cluttered following a trend for small cars and additional engine components required to meet exhaust emission standards. Several original equipment manufacturers require molding heater hoses and exhaust emission hoses to a particular serpentine shape for component packaging where heretofore, such hoses could be freely shaped from lengths cut from reels of bulk hose. The trend for molding hoses molded to several different shapes makes it difficult or expensive for aftermarket suppliers to stock all hoses necessary to fit all applications.

Heater hoses usually have an inside diameter ranging from about 0.5 to about 1 inch. Reformable inserts for such hoses have been proposed but such inserts introduce several drawbacks. The inserts, by definition, introduce some blockage into the hose bore which, in the case of the smaller hoses, is unsatisfactory. Also, the reformable inserts do not solve the problems of the aftermarket supplier because each reformable insert must be designed for a hose of specific length. Thus, such a solution to shape retentive hose prevents an aftermarket supplier to cut random lengths of hose from a reel or it prevents a user from cutting a piece of aftermarket supplied hose to a shorter, more desirable length. An example of a formable insert for hose appears in U.S. Pat. No. 4,327,775.

In avoiding the fixed lengths and bore obstruction problems of hoses with reformable inserts disposed in a hose bore, one prior art hose construction uses a helical wire embedded in a hose cover. The wire has a diameter less than the cover thickness so it does not interfere when the hose is coupled to a nipple with a circumferential type hose clamp. While such hose has collapse resistance when bent to a small bend radius, it does not have shape retentivity.

SUMMARY OF THE INVENTION

In accordance with the invention, a formable hose is provided that has serpentine shape retentivity and collapse resistance. A polymeric tube is surrounded with a helical wire, twined reinforcement and cover containing a single, longitudinally oriented formable wire means. In a preferred construction, the cover has a somewhat egg-shaped exterior when viewed in axial cross section so that one portion of the cover has a greater thickness than a second portion of the cover. The formable wire means is disposed in the thicker portion of the cover.

Advantages of the invention will be apparent after reviewing the drawings and description thereof wherein.

DESCRIPTION OF PREFERRED EMBODIMENT

Figure 1:
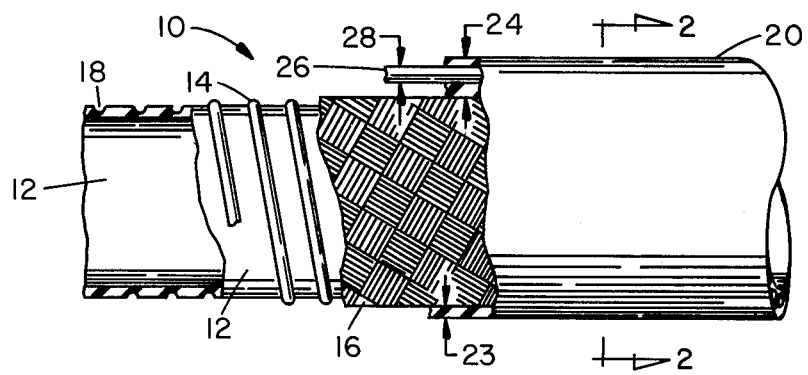
FIG. 1 is a partially cutaway side view exposing various features of the invention.
Figure 2:
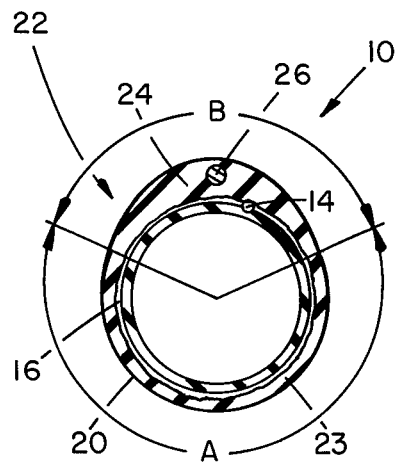
FIG. 2 is a transverse cross sectional view taken along the line 2—2 of FIG. 1.

Referring to FIGS. 1 and 2, a hose 10 of the invention has a polymeric tube 12 surrounded with a helical wire 14 and twined reinforcement 16 such as a textile braid. The helical wire 14 may partially embed 18 in the polymeric tube 12 to inhibit longitudinal movement of the helical coils. The helical wire also provides collapse resistance when the hose is bent to small bend radii (for example a bend radius that is about 2.5 times the tube diameter).

A polymeric cover 20 surrounds the tube, helical wire, and twined reinforcement. Preferably, the cover has an exterior surface that is generally elliptical or "egg shape" 22 when the hose is viewed in transverse cross section, FIG. 2. The egg shape is formed by the cover having a thickness 23 that is substantially uniform throughout a major portion A of the tube circumference and a variable greater thickness 24 throughout a second portion B of the tube circumference. The cover has substantially a uniform cross section throughout the tube length.

A reformable wire 26 means is embedded solely in the thicker portion of the cover and it extends longitudinally of the tube throughout its length. The reformable wire is sufficiently stout to retain the hose in a serpentine shape when the hose is bent. To achieve retentivity, it is preferred that the reformable wire 26 have a diameter 28 that is greater than the minimum cover thickness 22. This relationship is desired because a cover of uniform thickness equal to the maximum cover thickness 24 would add rigidity to the hose that would impair the wire means capability of giving the hose shape retentivity.

The manufacturing process may cause the cover and reformable wire to be located along a shallow helix relative to the helical wire reinforcement. However, such a shallow helical angle does not detract from the hose shape retentivity or formability.

Figure 3:
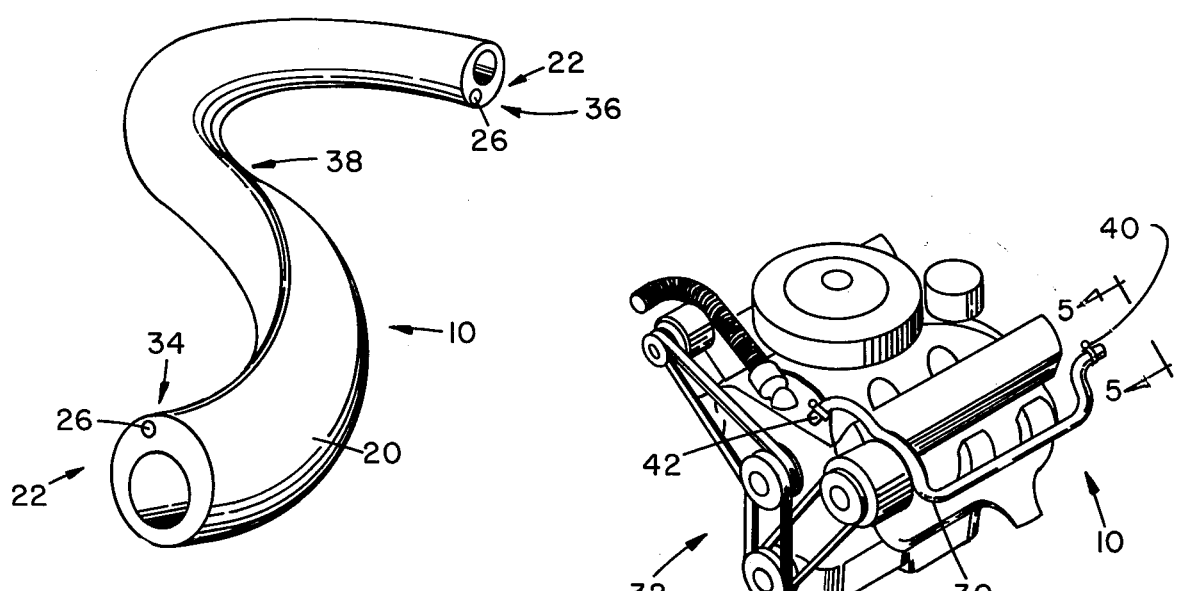
FIG. 3 is an isometric view showing a length of hose of the invention as formed to a desired retentive shape.
Figure 4:
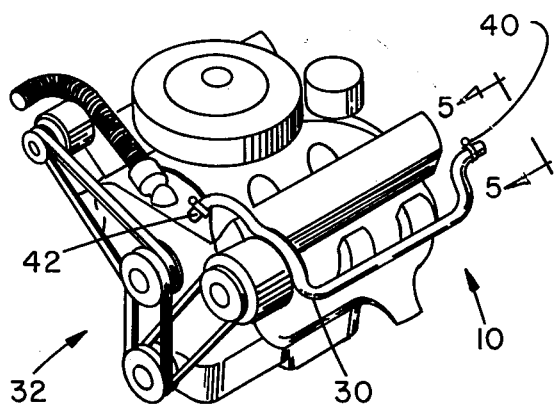
FIG. 4 is a schematical view showing a length of hose of the invention as installed on an automotive engine.

In use, the hose 10 is bent to any desired serpentine shape (FIG. 3) or configuration such as installed as a heater hose 30 on an automotive engine 32 (FIG. 4). The wire reinforcement means being solely in the thicker cover portion is free to twist with the hose and change its circumferential position in the hose to accommodate a desired bend. For example, the reformable wire may take a somewhat helical path and go from a top position 34 to a bottom position 36 as the hose bends and twists 38. The reformable wire retains the desired hose shape and the helical wire prevents the tube from collapsing. The circumferential positioning of the reformable wire in cooperation with the helical wire allow the hose to be bent and retained to very small bend radii. For example, a hose having a 0.625 inch internal diameter tube, a 0.041 inch diameter helical wire and a 0.125 inch diameter reformable wire may be bent to a 1.5 inch bend radius.

Figure 5:
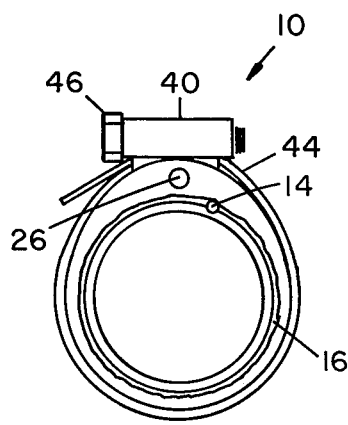
FIG. 5 is an axial view taken generally in the direction along the line 5—5 of FIG. 4 showing a hose end with a circumferential type hose clamp installed.

As illustrated by FIGS. 4 and 5, a circumferential type clamp, such as a helical screw band clamp 40 is used to couple the hose to a nipple 42. The smoothness of the generally egg-shaped exterior surface 22 allows substantially circumferential contact with the band 44 of the clamp even when the non-hose conforming helical screw assembly 46 is positioned juxtaposed the reformable wire means 26. The circumferential contact between the exterior surface and band assures generation of necessary radial forces along the tube inside circumference to effect sealing the tube with the nipple. The position of the helical screw assembly relative to the hose as shown in FIG. 5 represents the most difficult sealing situation because of clamp stiffness at the helical screw assembly. In all other screw assembly positions, the band 44 easily conforms to the exterior surface to effect sealing of the tube against the nipple. The egg-shape contour or cross section is preferred so that the screw assembly can be located at any circumferential position on the hose to provide a necessary radial force to avoid leaks. Surprisingly, no deleterious damage is done to the hose or nipple because of a high pressure point juxtaposed the relatively large diameter reformable wire when the clamp is tightened.

ADDITIONAL EMBODIMENTS

Figure 6:
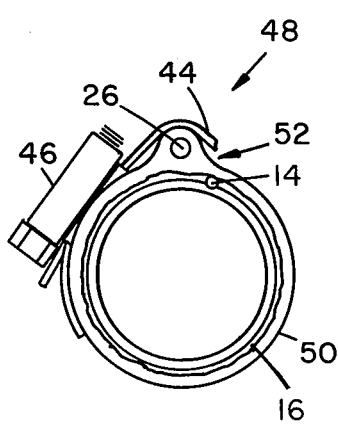
FIG. 6 is a view similar to that of FIG. 5 but showing another embodiment of the invention.

Referring to FIG. 6, another hose 48 of the invention is shown. A polymeric cover 50 has somewhat of a siamese tube-by-tube configuration with the cover contour being slightly concave 52 juxtaposed the reformable wire means 26. Except for the cover with its concave portion, the hose is constructed in the manner as described for FIGS. 1 through 5. While a hose with such concave portions can be effectively used to seal with a nipple, care must be taken to locate the helical screw assembly to be offset from the reformable wire means 26. When the screw means 46 is offset from the wire, the band 44 can adequately adjust to the cover contour and apply the necessary radial forces to couple the hose with a nipple and avoid leaks.

However, if the helical screw assembly is positioned juxtapoed the reformable wire in a manner similar to that shown in FIG. 5, leakage around a nipple is likely to occur because of inadequate radial pressure around some portions of the hose.

The foregoing description is made for purpose of illustration only and is not intended to limit the scope of the invention which is to be determined from the appended claims.

What is claimed is:

1. A formable hose with serpentine shape retentivity and of the type for coupling to nipples with circumferential type clamps, the hose comprising:
   a polymeric tube having a circumference and length, the tube surrounded with a helical wire and twined reinforcement;
   a polymeric cover surrounding the tube, helical wire and twined reinforcement, the cover having a first portion of substantially uniform thickness throughout a major portion of the tube circumference and a second portion of a greater thickness than the first portion thickness and continuing throughout a minor portion of the tube circumference, the first portion and second portion of substantially uniform cross section throughout the tube length; and
   a reformable wire embedded solely in the second portion of the cover and extending generally longitudinally of the tube throughout its length, the reformable wire sufficiently stout to retain the hose in a serpentine shape.

2. The formable hose as claimed in claim 1 wherein the cover has an exterior surface of generally elliptical shape when the hose is viewed in transverse cross section, the exterior surface defining a means for contacting substantially an entire inner peripheral surface of a circumferential type clamp.

3. The formable hose as claimed in claims 1 or 2 wherein the reformable wire has a diameter that is greater than the first portion cover thickness.

4. The formable hose as claimed in claims 1 or 2 wherein the helical wire is partially embedded in an outer surface portion of the tube.

5. The formable hose as claimed in claims 1 or 2 wherein the cover and reformable wire are located along a shallow helix relative to the wire reinforcement.

6. A formable hose with serpentine shape retentivity and of the type for coupling to nipples with circumferential type clamps, the hose comprising:
   a polymeric tube having a circumference and length, the tube reinforced with a surrounding twined reinforcement and a helical wire;
   a polymeric cover surrounding the tube, twined reinforcement and helical wire, the cover having a first portion having thickness throughout a major portion of the tube circumference and a second portion having a greater thickness than the first portion thickness and continuing throughout a minor portion of the tube circumference, the first portion and second portion of substantially uniform cross section throughout the tube length; and
   a reformable wire embedded solely in the second portion of the cover and extending generally longitudinally of the tube throughout its length, the reformable wire sufficiently stout to retain the hose in a serpentine shape.

* * * * *